United States Patent
Wu et al.

(10) Patent No.: US 7,737,866 B2
(45) Date of Patent: Jun. 15, 2010

(54) AUTO-PARKING DEVICE

(75) Inventors: Jui-Hung Wu, Changhua County (TW); Jing-Fu Liu, Changhua County (TW); Wang-Shuan Lee, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 287 days.

(21) Appl. No.: 11/862,206

(22) Filed: Sep. 27, 2007

(65) Prior Publication Data

US 2009/0085771 A1 Apr. 2, 2009

(51) Int. Cl.
*B60Q 1/48* (2006.01)
*G08G 1/14* (2006.01)

(52) U.S. Cl. .............. 340/932.2; 340/435; 340/937; 701/49

(58) Field of Classification Search .......... 340/932.2, 340/435, 943, 937; 348/148; 701/49, 36; 180/204

See application file for complete search history.

(56) References Cited

U.S. PATENT DOCUMENTS

| | | | | |
|---|---|---|---|---|
| 3,117,642 A | * | 1/1964 | Larinoff | 180/204 |
| 3,669,200 A | * | 6/1972 | Odell, Paul J. | 340/932.2 |
| 4,735,274 A | * | 4/1988 | Good et al. | 180/204 |
| 4,931,930 A | * | 6/1990 | Shyu et al. | 340/425.5 |
| 6,061,002 A | * | 5/2000 | Weber et al. | 340/932.2 |
| 6,097,314 A | * | 8/2000 | Desens et al. | 340/932.2 |
| 6,212,452 B1 | * | 4/2001 | Shimizu et al. | 701/41 |
| 6,223,847 B1 | * | 5/2001 | Shimizu et al. | 180/204 |
| 6,366,221 B1 | * | 4/2002 | Iisaka et al. | 340/932.2 |
| 6,483,442 B2 | * | 11/2002 | Shimizu et al. | 340/932.2 |
| 6,929,082 B2 | * | 8/2005 | Kataoka et al. | 180/204 |
| 7,043,346 B2 | * | 5/2006 | Kubota et al. | 701/28 |
| 7,248,153 B2 | * | 7/2007 | Danz et al. | 340/435 |
| 7,366,595 B1 | * | 4/2008 | Shimizu et al. | 340/937 |
| 7,369,940 B2 | * | 5/2008 | Frank et al. | 340/932.2 |
| 7,392,121 B2 | * | 6/2008 | Arima et al. | 701/41 |
| 7,469,765 B2 | * | 12/2008 | Spannheimer et al. | 701/28 |
| 7,486,203 B2 | * | 2/2009 | Tanaka et al. | 340/932.2 |
| 7,516,003 B2 | * | 4/2009 | Maeda et al. | 701/41 |
| 2003/0160717 A1 | * | 8/2003 | Mattes et al. | 340/932.2 |
| 2007/0051547 A1 | * | 3/2007 | Fischer et al. | 180/204 |
| 2008/0077294 A1 | * | 3/2008 | Danz et al. | 340/932.2 |
| 2009/0125181 A1 | * | 5/2009 | Luke et al. | 701/36 |

* cited by examiner

*Primary Examiner*—Eric M Blount (57) ABSTRACT

An auto-parking device installed on a vehicle comprises a vehicle status sensing unit for detecting a state of a vehicle, an image acquisition unit for capturing vehicle outside image, a range sensing unit for measuring the space, a processing unit for receiving states of the vehicle from the vehicle status sensing unit, receiving environmental states from the image acquisition unit and range sensing unit, calculating a parking path based on parallel parking or back-in parking and then controlling the vehicle steering, throttle and brake via a driving control unit to automatically park the car into the space as per the planned parking path.

15 Claims, 7 Drawing Sheets

AUTO-PARKING DEVICE

BACKGROUND OF THE INVENTION

1. Field of the Invention

The present invention relates to auto-parking, and particularly to an auto-parking device, wherein an image acquisition unit (e.g. camera) and a range sensing unit (e.g. ultrasonic sensor) are used to aware the surrounding situation of the vehicle itself, a processing unit can program a parking path despite the initial position of the car.

2. Description of Related Art

Driving a car has become an integral part of modern life and thus parking is also an unavoidable maneuver in driving. However, most of the parking places are not so wide that the driver can park a car comfortably and easily. In most cases, the parking space is only slightly greater than the size of the car. Thus the parking operation often includes a series of repeated actions for moving forwards, backwards, leftwards and rightwards, such that the whole process would become tedious and difficult for drivers in particular novices.

Moreover, according to the statistics, careless collisions occur frequently during the parking maneuver. Although most of cars are coated with paint, the paint is vulnerable and easy to be damaged by the collision. Even a light collision will make the paint peel off and thus lead the metal substrate to readily get rusted. Subsequently, the driver will be burdened with a big expense on repairing and repainting. Hence, developing an auto-parking device that can adapt intelligently to variable circumstances and avoid undesired collisions is the goal many automotive companies are striving toward.

In one prior art patent, "car reversing auto-parking system", a car body is installed with a displacement detection device, an obstacle detection device, a microcomputer, etc. for deriving an auto-parking path so as to achieve the object of auto parking.

However, the prior art simply provides a fixed parking path. That is, in the beginning, the driver must stop the car at a specific position for performing the function of auto-parking. Therefore, the auto-parking ability proposed in the prior art is not only limited but also inflexible to the variation of the environment such that the driver may often have to park the car by himself (or herself).

Furthermore, although some other prior arts propose similar devices for automatic car reversing, an integral design including precise space detection by fusion of image and range sensing, as well as adaptive parking path planning has not been seen in these literatures. Hence, there is a necessity for a novel design which can improve the prior art deficiency.

SUMMARY OF THE INVENTION

Accordingly, the primary object of the present invention is to provide an auto-parking device, wherein an image acquisition unit (e.g. camera) and a range sensing unit are used to aware the surroundings so as to plan a parking path despite the initial position of the car.

To achieve above objects, the present invention provides an auto-parking device installed on a vehicle, comprising a vehicle status sensing unit for detecting the state of a vehicle, an image acquisition unit for capturing the vehicle outside image, a range sensing unit for measuring the space, a processing unit for calculating a proper parking path and controlling the vehicle steering, throttle and brake via a driving control unit to automatically park the car into a space as per the derived parking path.

The vehicle status sensing unit includes a reverse sensing unit, an angle sensing unit and a displacement sensing unit. The reverse sensing unit is connected to the vehicle shift mechanism to detect whether the shift is switched to reverse gear. The angle sensing unit is connected to the vehicle steering mechanism to detect the steering angle of a vehicle. The displacement sensing unit is connected with the vehicle speed so as to calculate the moving distance of a vehicle.

In the present invention, the processing unit is connected with the above-mentioned vehicle status sensing unit, i.e., reverse sensing unit, angle sensing unit, and displacement sensing unit, to acquire the information of reverse signal, steering angle and moving distance. Moreover, the image acquisition unit and range sensing unit will transmit the surrounding information including the outside image and space location to the processing unit. According to the received information and parking mode selection (back-in parking or parallel parking), the processing unit can real-time compute a proper parking path by the built-in formulas and send the command to the control unit. Then the processing unit will control the steering, throttle and brake of a vehicle via the driving control unit to automatically park the car into a space as per the planned parking path.

The operation process of the auto-parking device proposed by the current invention is described as follows.

Firstly, the auto-parking device is activated by switching on the power and then the adjusting unit (e.g. touch panel) is used to select the parking mode so as to determine either parallel parking or back-in parking. Moreover, the image acquisition unit and range sensing unit are used to acquire the outside information and then the processing unit will map the surrounding parking environment and judge whether the space is enough to park or not.

If the space is big enough, the vehicle will brake automatically and instruct the driver to switch the shift into the reverse gear. Meanwhile, a predicted parking spot will be calculated by the processing unit and superimposed onto the image of actual parking vacancy, and then shown on the display unit. Furthermore, the driver can fine adjust the predicted spot via the display unit or the adjusting unit to determine the final parking location. After user's confirmation, the processing unit will re-compute the final parking path and control the vehicle steering, throttle and brake to perform the auto-parking maneuver via the driving control unit. During the parking process, if any intervention of the user in the operation is detected by the processing unit, the auto-parking device will be deactivated automatically and issue an alert as well as return the control priority back to the user. Moreover, if any obstacles invading the planned path are detected, the auto-parking operation will be similarly suspended and hand over the control priority to the user. Upon the elimination of the obstacle, the user can reactivate the device to complete the auto-parking operation.

From the aforementioned statement, it proves this invention definitely possessed the advancement and practicability, and has great potential for commercialization. The various objects and advantages of the present invention will be more readily understood upon review of the following detailed description in conjunction with the appended drawings.

DETAILED DESCRIPTION OF THE INVENTION

Referring In order that those skilled in the art can further understand the present invention, a description will be provided in the following in details. However, these descriptions and the appended drawings are only used to lead those skilled in the art to understand the objects, features, and characteristics of the present invention, but not to be used to confine the scope and spirit of the present invention defined in the appended claims.

Figure 1:
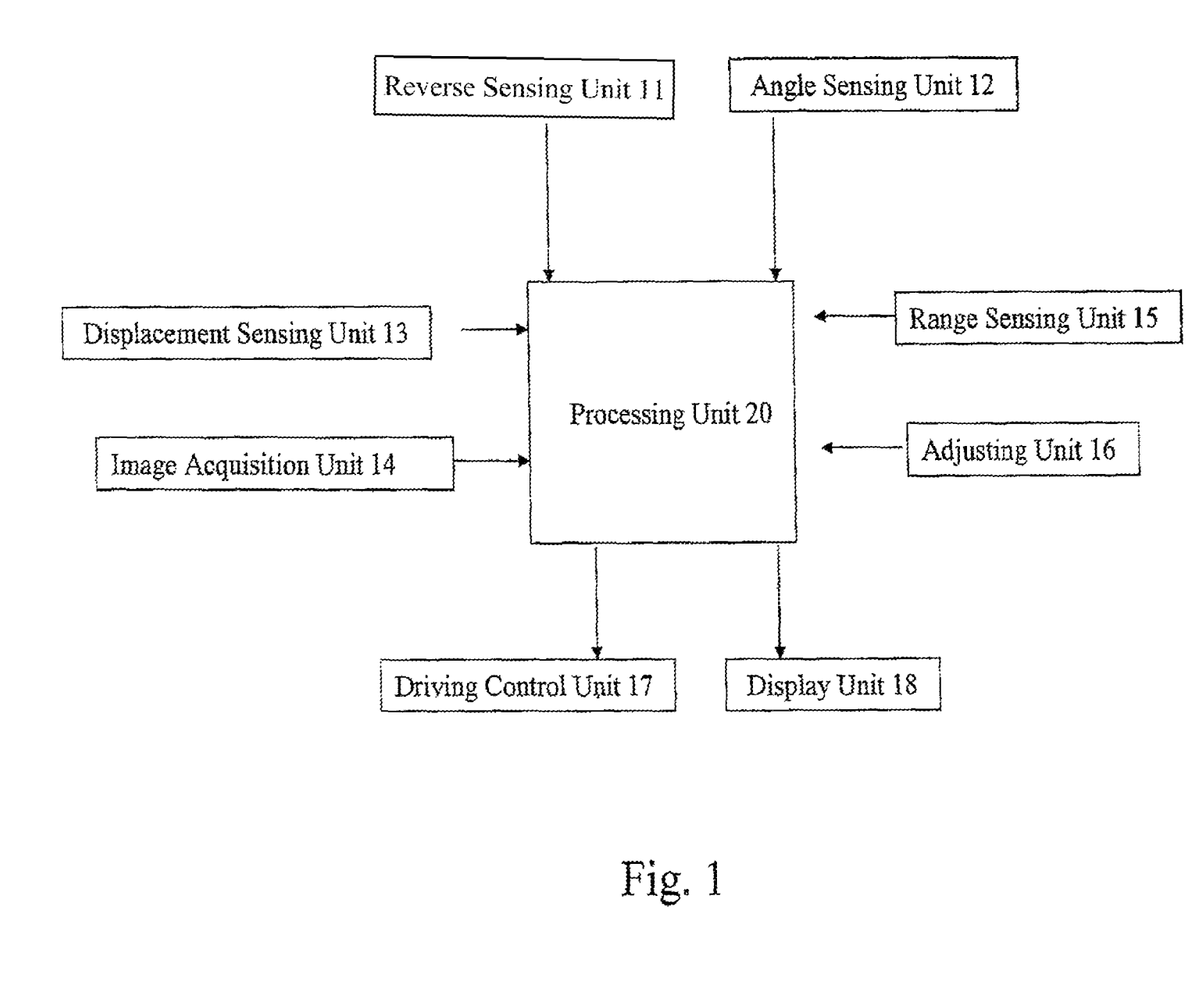
FIG. 1 is a block diagram of the auto-parking device according to the present invention.

The present invention relates to an auto-parking device, as shown in FIG. 1, the auto-parking device 1 can be installed on a vehicle. The auto-parking device 1 of the present invention has the following elements.

A vehicle status sensing unit serves for detecting the state of the vehicle. The vehicle status sensing unit includes a reverse sensing unit 11, an angle sensing unit 12 and a displacement sensing unit 13. The reverse sensing unit 11 is connected to a vehicle shift mechanism to detect whether the shift is switched to the reverse gear. The angle sensing unit 12 is connected to a vehicle steering mechanism to detect the steering angle of the vehicle. The displacement sensing unit 13 is connected with a vehicle speed so as to calculate the moving distance of the vehicle.

An image acquisition unit 14 is installed at the exterior of the vehicle for capturing the vehicle outside image.

A range sensing unit 15 is installed at the exterior of the vehicle for measuring a parking space.

An adjusting unit 16 serves for actuating the auto-parking device or receiving the command signals for setting and adjusting from the user.

A driving control unit 17 serves for controlling a steering, a throttle and a brake of the vehicle to automatically park the vehicle into the parking space as per the derived parking path.

A display unit 18 serves for displaying images, which can be a touch screen so that the user can input the command directly.

A processing unit 20 is connected with the reverse sensing unit 11, the angle sensing unit 12, the displacement sensing unit 13, the image acquisition unit 14, the range sensing unit 15, the adjusting unit 16, the driving control unit 17, and the display unit 18 to serve for calculating a proper parking path; and In the present invention, the reverse sensing unit 11, angle sensing unit 12, and the displacement sensing unit 13 are responsible for acquiring the information of reverse signal, steering angle and moving distance, and then transmit the data to the processing unit 20. Then image acquisition unit 14 and range sensing unit 15 serve to acquire the surrounding status of the vehicle and then send the related signals to the processing unit 20. Subsequently, the processing unit 20 determines a proper parking path in accordance with the received signals and the built-in formula when one of parallel parking and back-in parking is selected. Then the processing unit 20 controls the vehicle to carry out the parking maneuver through the driving control unit 17 along the planned parking path.

Figure 2:
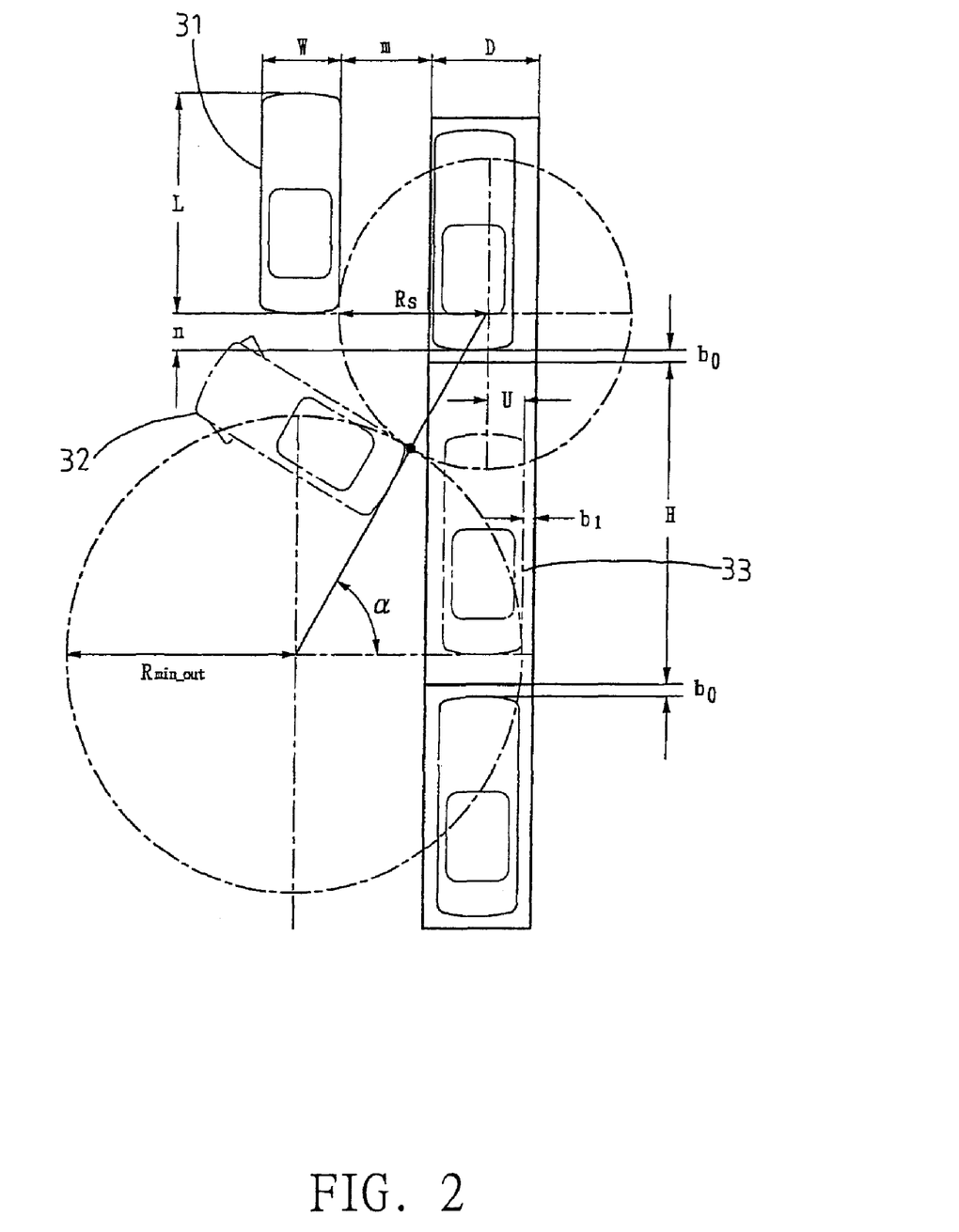
FIG. 2 is a schematic view illustrating a parking path for the parallel parking according to the present invention.
Figure 3:
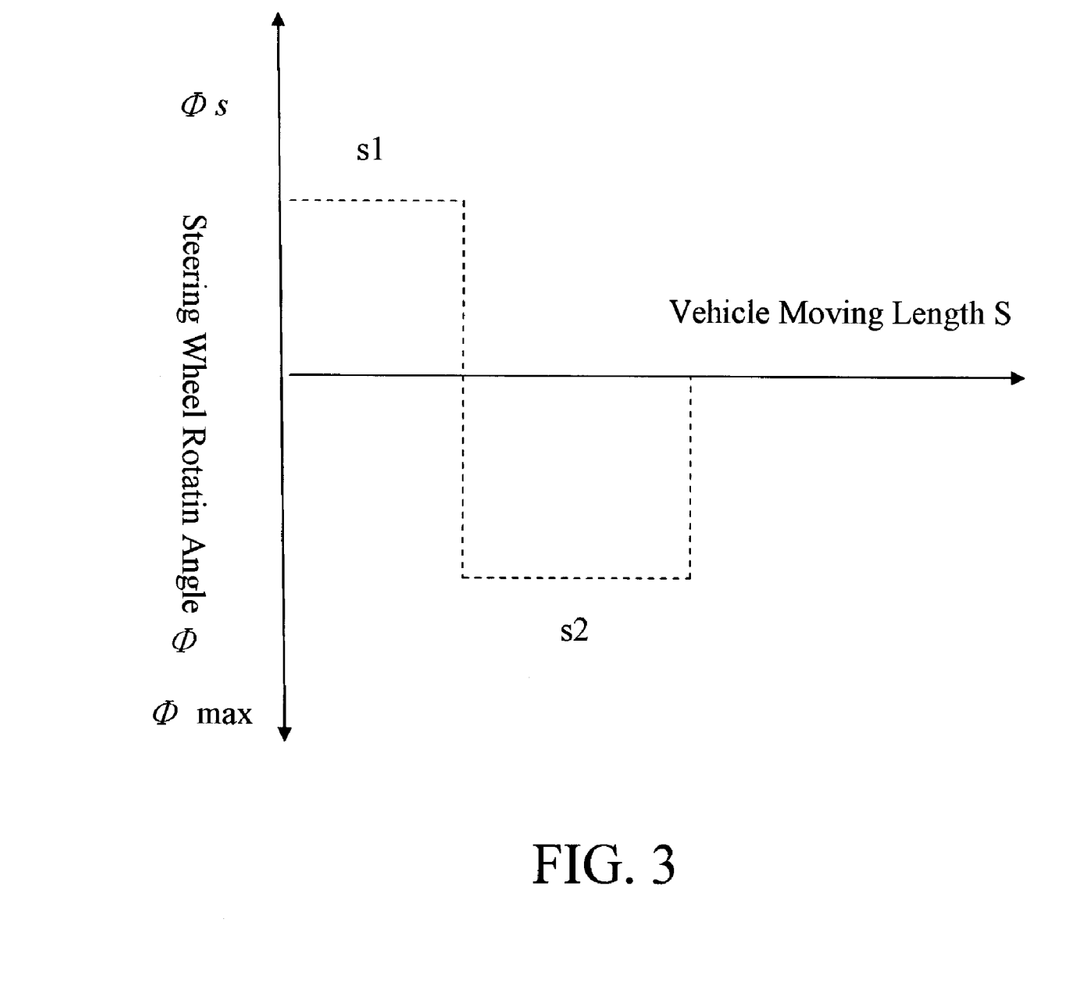
FIG. 3 illustrates the relation between the steering wheel angle and the vehicle moving distance for the parallel parking according to the present invention.
Figure 4:
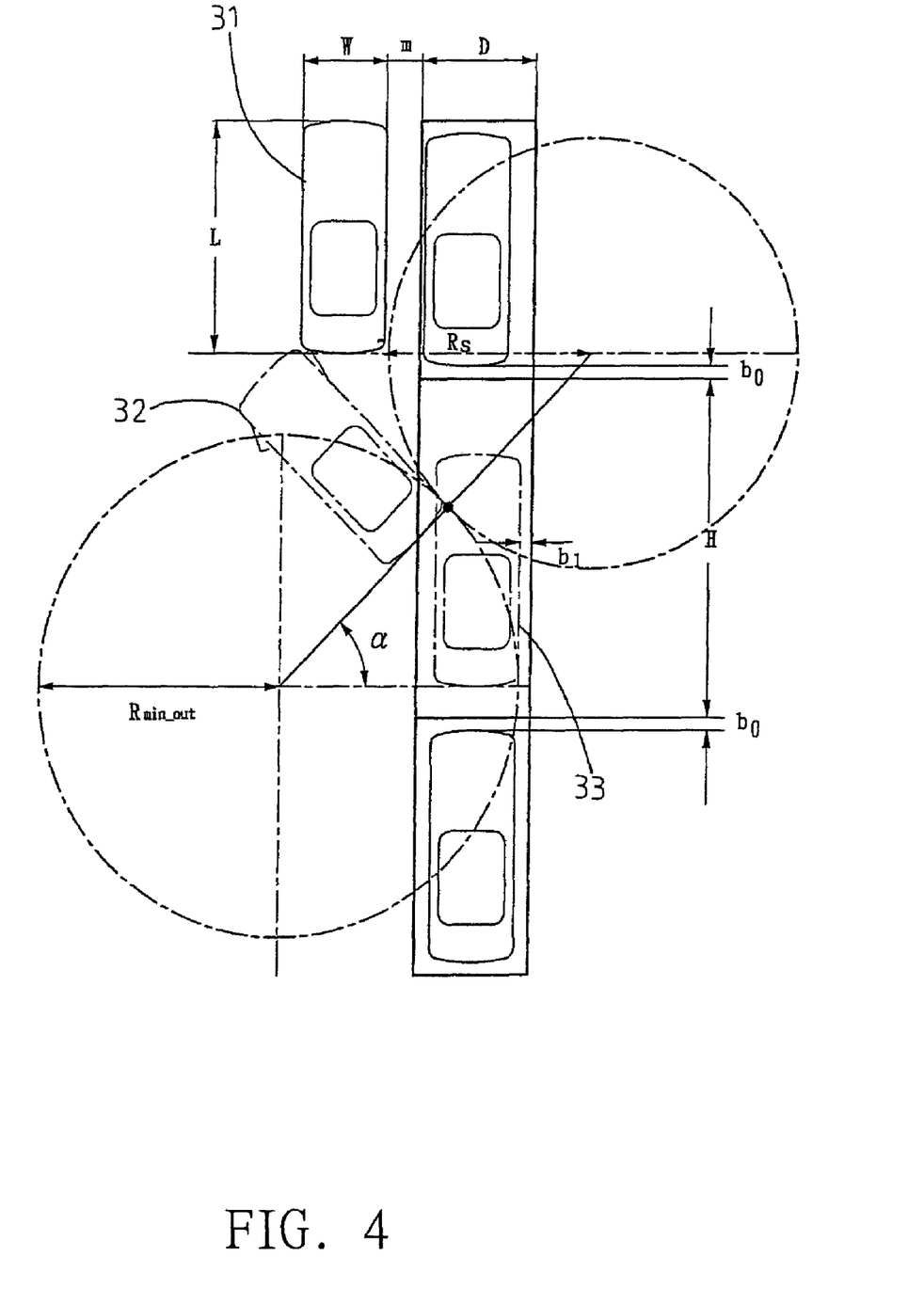
FIG. 4 illustrates another parking path for the parallel parking at a different initial position according to the present invention.
Figure 5:
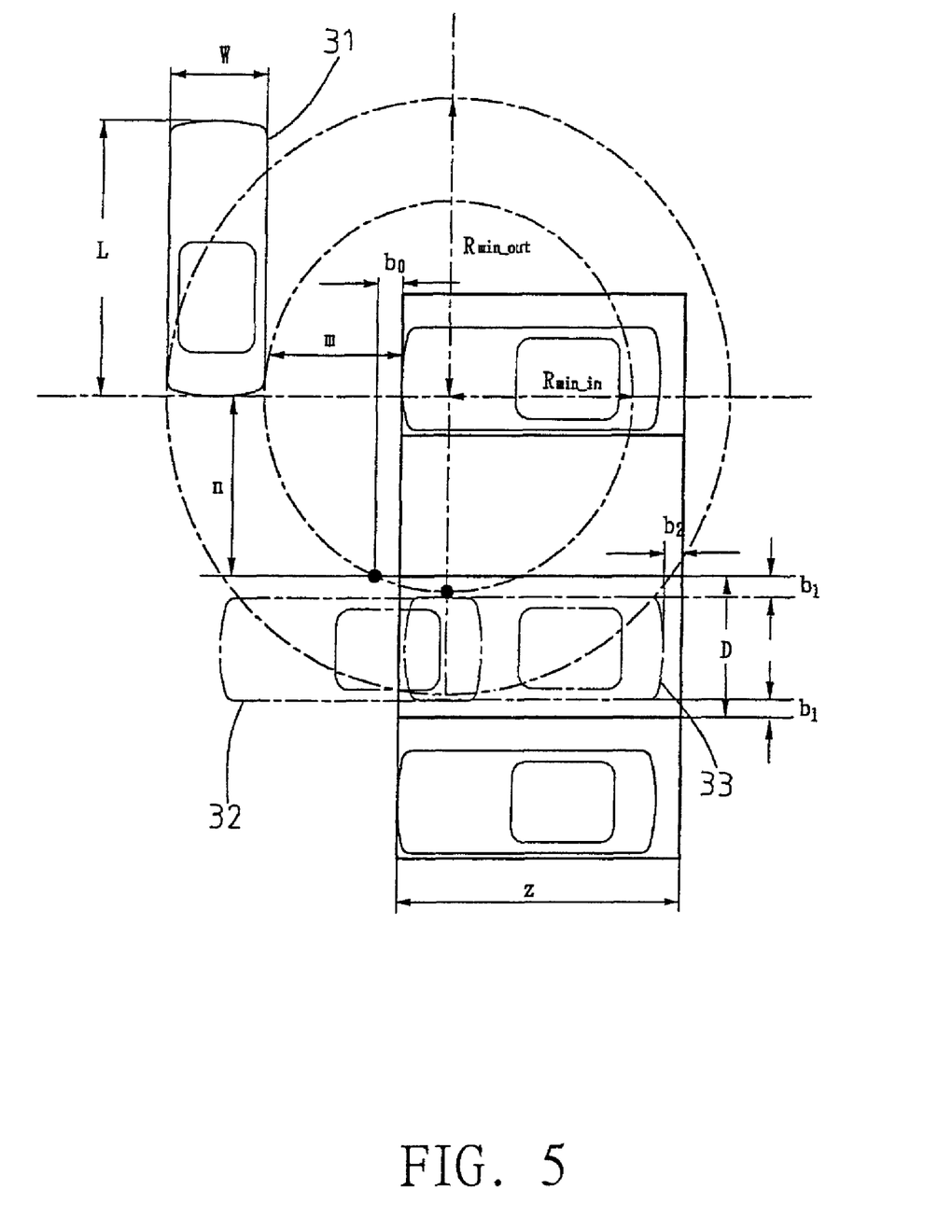
FIG. 5 is a schematic view illustrating a parking path for the back-in parking according to the present invention.
Figure 6:
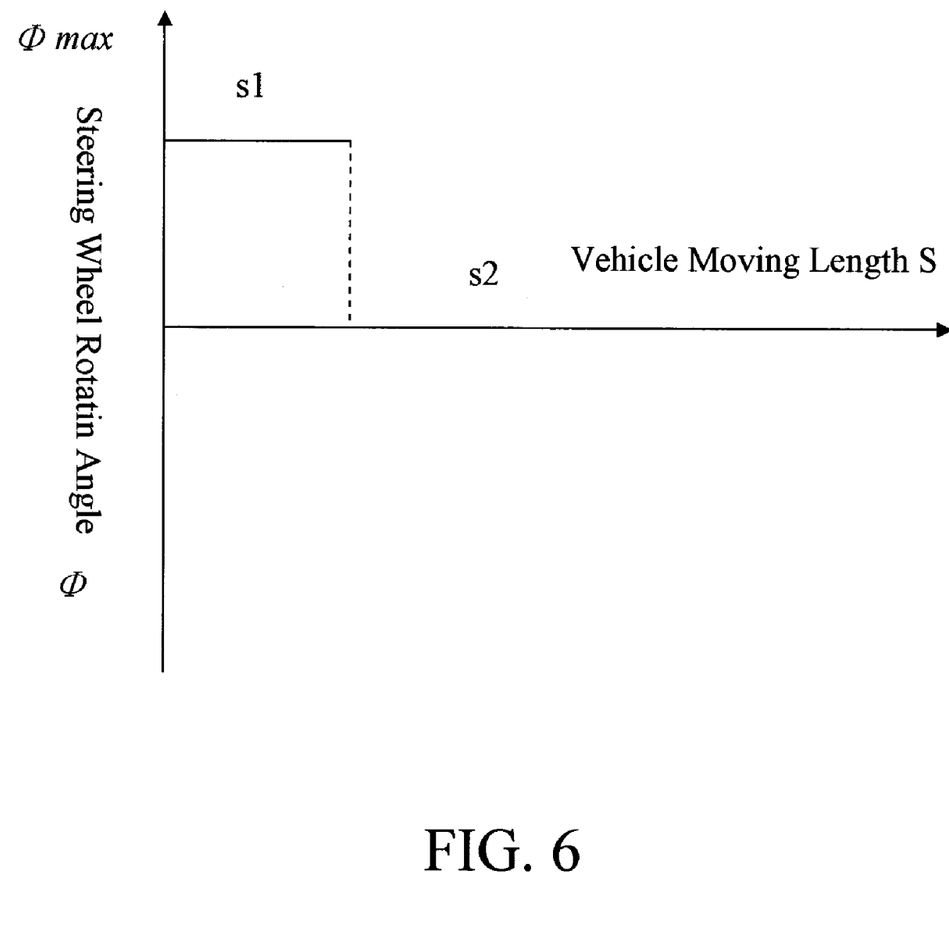
FIG. 6 illustrates the relation between the steering wheel angle and the vehicle moving distance for the back-in parking according to the present invention.
Figure 7:
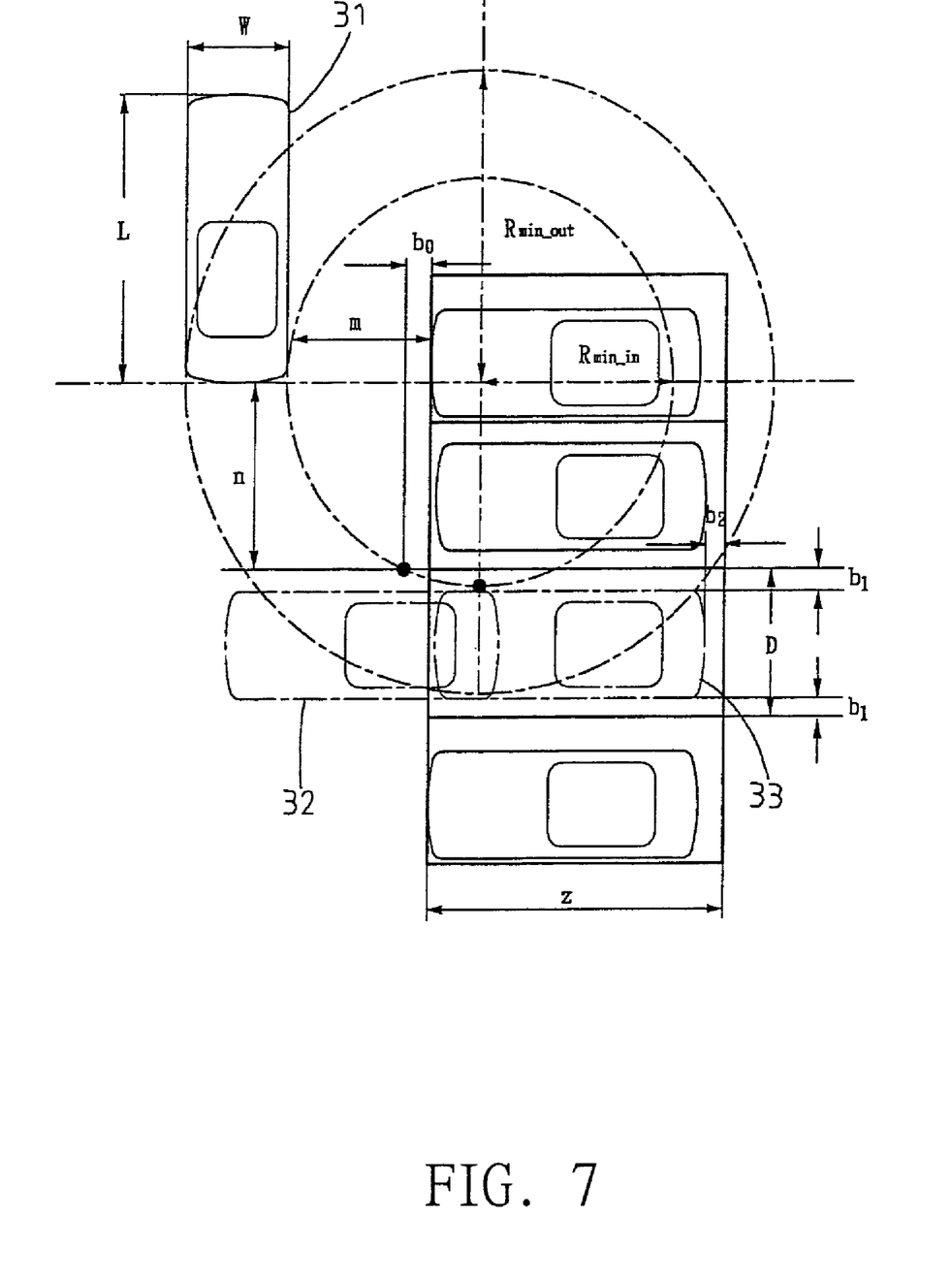
FIG. 7 is a schematic view illustrating another parking path for the back-in parking at a different initial position according to the present invention.

Referring to FIGS. 2 to 7, the planning for the parking path by the processing unit 20 is illustrated. FIGS. 2 to 4 show the illustration of parallel parking (namely, parking a vehicle in line with adjacent parked cars) and FIGS. 5 to 7 show the illustration of back-in parking (namely, parking a vehicle in parallel to adjacent parked cars).

Referring to FIGS. 2 to 4, the parameters used for calculating the parallel parking path by the processing unit 20 include:

The vehicle length L, the wheelbase l, the vehicle width W, the steering ratio N (i.e., the ratio of the steering wheel angle to the front wheel turning angle), the distance from the rear axle to the vehicle tail c and the maximum steering wheel angle $\phi_{max}$. The above coefficients are known for a specific vehicle and thus can be pre-stored in the processing unit 20.

The length margin of the parking space $b_0$ and the width margin of the parking spaces $b_1$ are preset values in auto-parking of the auto-parking device 1.

A width of the parking space D, a lateral distance between an initial position of the host car and an obstacle in front of the target parking space m, a longitudinal distance between an initial position of the host car tail and an obstacle in front of the target parking space n can be measured by the image acquisition unit 14 and range sensing unit 15.

The formulas for computing the parallel parking path are expressed as follows.

$$H = \sqrt{(L-c)^2 + 2R_{min\_out}(D-b_1) - (D-b_1)^2} + c$$

$$R_s = \left[l \cdot \cot\left(\frac{\phi_s}{N}\right) - \frac{W}{2}\right]$$

$$R_{min\_out} = \left[l \cdot \cot\left(\frac{\phi_{max}}{N}\right) + \frac{W}{2}\right]$$

$$\phi_s = N \times \cot^{-1}\left\{\frac{\left[\frac{(H+n+b_0)^2 - 2R_{min\_out}(m+D-b_1) + (m+D-b_1)^2}{2(m+D-b_1)}\right]}{l} + \frac{W}{2}\right\}$$

$$\alpha = \sin^{-1}\left(\frac{H+n+b_0}{R_{min\_out}+R_s}\right)$$

$$S_1 = R_s \times \alpha = R_s \times \sin^{-1}\left(\frac{H+n+b_0}{R_{min\_out}+R_s}\right)$$

$$S_2 = R_{min\_out} \times \alpha = R_{min\_out} \times \sin^{-1}\left(\frac{H+n+b_0}{R_{min\_out}+R_s}\right)$$

Where H is the length of the parking space needed, $R_z$ is the turning radius of the inner rear wheel for the first turn, $R_{min\_out}$ is the minimum turning radius of the outer rear wheel of the vehicle for the second turn; $\phi_s$ is the rotation angle of the steering wheel for the first turn; $S_1$ is the moving length of the inner rear wheel for the first turn, $S_2$ is the moving length of the inner rear wheel for the second turn; and $\alpha$ is the included angle between an initial position (31) and a reversing point (32).

As shown in FIGS. 2 and 3, the parallel parking path programmed by the processing unit 20 indicates that the vehicle starts from the initial position 31 to the reversing point 32 by the first turn and then moves to an ending point 33 by the second turn.

For the first turn, the moving length $S_1$ from the initial position 31 to the reversing point 32 is an arc which is a part of the turning circle of the inner rear wheel with a radius of $R_z$ at the steering wheel angle of $\phi_s$. Similarly, for the second turn, the moving length $S_2$ from the reversing point 32 to the ending point 33 is a part of the turning circle of the outer rear wheel with a minimum radius of $R_{min\_out}$ at the maximum steering wheel angle of $\phi_{max}$. Note that the side of the vehicle near to the circle center represents the inner side and thus the other side of the vehicle is the outer side. For instance, in the first turn, the right side of the vehicle is the inner side and the left side of the vehicle is the outer side. Contrarily, in the second turn, the right side of the vehicle is the outer side and the left side of the vehicle is the inner side.

For computation of the afore-mentioned parking path, the vehicle parameters of L, l, W, $N_S$, c and $R_{min\_out}$, preset values of $b_0$ and $b_1$, and measurement values of D, m and n are used in the processing unit 20. The rotation angle $\theta_z$ of the steering wheel and the corresponding moving length $S_1$ are calculated for the first turn. Then the moving length $S_2$ for the second turn is calculated with a maximum steering angle $\psi_{max}$ in the opposite direction. Prior to performing the auto-parking operation, the processing unit 20 will check whether the length of the parking space measured is greater than a required minimum value of H+2$b_0$ to ensure the parking maneuver against collisions.

The way of auto-parking of the present invention is not confined to the initial position of the vehicle. Namely, the vehicle is not necessary to stop at a specific starting position of a predetermined path. The formula for parallel parking built in the present invention can still be used flexibly. As shown in FIG. 4, when the longitudinal and lateral distances, m and n, of the host vehicle to the obstacle are changed, the formula can be used for programming different parking path so as to achieve the object of auto-parking.

Further referring to FIGS. 5 and 6, the parameters used for calculating the back-in parking path by the processing unit 20 include:

The vehicle length L, the wheelbase l, the vehicle width W, the steering ratio N (i.e., the ratio of the steering wheel angle to the front wheel turning angle); the distance from the rear axle to the vehicle tail c and the maximum steering wheel angle $\phi_{max}$. The above coefficients are known for a specific vehicle and thus can be pre-stored in the processing unit 20.

The length margin of the parking space $b_0$ and the width margin of the parking spaces $b_1$ are preset values in auto-parking of the auto-parking device 1.

A width of the parking space D, a length of the parking space Z, a lateral distance between an initial position of the host car and an obstacle in front of the target parking space m, a longitudinal distance between an initial position of the host car tail and an obstacle in front of the target parking space n can be measured by the image acquisition unit 14 and range sensing unit 15.

The formulas for computing the back-in parking path are expressed as follows.

$$R_{min\_in} = \left[ l \cdot \cot\left(\frac{\phi_{max}}{N}\right) - \frac{W}{2} \right]$$

$$R_{min\_out} = \left[ l \cdot \cot\left(\frac{\phi_{max}}{N}\right) + \frac{W}{2} \right]$$

$$S_1 = R_{min\_in} \times \frac{\pi}{2}$$

-continued
$$S_2 = Z - (R_{min\_in} - m) - c - b_2$$

where $R_{min\_in}$ is the minimum turning radius of the inner rear wheel of the vehicle, $R_{min\_out}$ is the minimum turning radius of the outer rear wheel of the vehicle, $S_1$ is the moving length of the inner rear wheel before the reversing point, $S_2$ is the moving length of the inner rear wheel after the reversing point. Note that the side of the vehicle near to the circle center represents the inner side and thus the other side of the vehicle is the outer side.

As shown in FIGS. 5 and 6, the back-in parking path programmed by the processing unit 20 indicates that the vehicle starts from the initial position 31 to the reversing point 32 and then moves straightly from the reversing point 32 to the ending point 33.

For the initial turn, the moving length $S_1$ from the initial position 31 to the reversing point 32 is an arc which is a part of the turning circle of the inner rear wheel with a minimum radius of $R_{min\_in}$ at the maximum steering wheel angle of $\phi_{max}$. Similarly, for the second turn, the moving length $S_2$ from the reversing point 32 to the ending point 33 is a part of the turning circle of the outer rear wheel with a minimum radius of $R_{min\_out}$ at the maximum steering wheel angle of $\phi_{max}$.

When arriving at the reversing point 32, the steering wheel is rotated to the angle of zero to make the vehicle back straightly for a length of $S_2$ to the ending point 33.

Moreover, before performing the auto-parking operation, the processing unit 20 will check whether the width of the parking space measured is greater than a required minimum value of W+2$b_1$, whether the detected value m is greater than a required minimum value of $R_{min\_in} - \sqrt{R_{min\_in}^2 - (R_{min\_out} - W - b_1)^2} + b_0$ and whether n is equal to the value of $R_{min\_out}W - c - b_1$. Only if these conditions are conformed completely, the auto-parking maneuver can be performed.

The way of the present invention is not confined to the initial position of the vehicle. That is, the vehicle is not necessary to stop at a specific starting position. The formula for back-in parking built in the present invention can still be used flexibly and unaffected by the adjacent parked vehicles, as shown in FIG. 7.

The auto-parking process of the present invention will be described herein. Firstly, the auto-parking device 1 is activated by switching on the power and then the adjusting unit (e.g. touch panel) is used to select the parking mode so as to determine either parallel parking or back-in parking. Moreover, the image acquisition unit 14 and range sensing unit 15 are used to acquire the outside information and then the processing unit 20 will map the surrounding parking environment and judge whether the space is enough to park or not.

If the space is big enough, the vehicle will brake automatically and instruct the driver to switch shift into the reverse gear. Meanwhile, a predicted parking location will be calculated by the processing unit and superimposed onto the image of actual parking vacancy, and then shown on the display unit. Furthermore, the driver can fine adjust the predicted spot via the display unit 18 or the adjusting unit 16 to determine the final parking location. After user's confirmation, the processing unit will re-compute the final parking path and control the vehicle steering, throttle and brake to perform the auto-parking maneuver via the driving control unit. During the parking process, if any intervention of the user in the operation is detected by the processing unit, the auto-parking device will be deactivated automatically and issue an alert as well as return the control priority back to the user. Moreover, if any obstacles invading the planned path are detected, the auto-parking operation will be similarly suspended and hand over the control priority to the user. Upon the elimination of the obstacle, the user can reactivate the device to complete the auto-parking operation.

The present invention is thus described and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An auto-parking device installed on a vehicle, comprising:
   a vehicle status sensing unit for detecting a state of the vehicle,
   an image acquisition unit for capturing the vehicle outside image,
   a range sensing unit for measuring a parking space,
   a processing unit for receiving states of the vehicle from the vehicle status sensing unit, receiving the surrounding information of the vehicle from the image acquisition unit and the range sensing unit, and calculating a parking path, the parking path including a first turn starting from an initial position to a reverse point and a second turn starting from the reverse point to an ending point, the parking path calculated according to a lateral distance between the initial position of the vehicle and an obstacle in front of the measured parking space and a longitudinal distance between the initial position of a vehicle tail and the obstacle in front of the measured parking space, such that the vehicle is unnecessary to stop at a specific initial position, the processing unit connected to a display unit,
   wherein in parallel parking, following parameters are used,
   a vehicle length L,
   a wheelbase l,
   a vehicle width W;
   a steering ratio N being the ratio of the steering wheel angle to the front wheel turning angle,
   a distance from the rear axle to the vehicle tail c,
   a maximum steering wheel angle $\phi_{max}$,
   a length margin of the parking space $b_0$,
   a width margin of the parking spaces $b_1$,
   a width of the parking space D,
   the lateral distance between the initial position of the host vehicle and the obstacle in front of the target parking space m,
   the longitudinal distance between the initial position of the host vehicle tail and the obstacle in front of the target parking space n;
   formulas for computing the parallel parking path expressed as follows:

$$H = \sqrt{(L-c)^2 + 2R_{min\_out}(D-b_1) - (D-b_1)^2} + c$$

$$R_s = \left[l \cdot \cot\left(\frac{\phi_s}{N}\right) - \frac{W}{2}\right]$$

$$R_{min\_out} = \left[l \cdot \cot\left(\frac{\phi_{max}}{N}\right) + \frac{W}{2}\right]$$

$$\phi_s = N \times \cot^{-1}$$

-continued $$\left\{ \frac{\left[\frac{(H+n+b_0)^2 - 2R_{min\_out}(m+D-b_1) + (m+D-b_1)^2}{2(m+D-b_1)}\right]}{l} + \frac{W}{2} \right\}$$

$$\alpha = \sin^{-1}\left(\frac{H+n+b_0}{R_{min\_out}+R_s}\right)$$

$$S_1 = R_s \times \alpha = R_s \times \sin^{-1}\left(\frac{H+n+b_0}{R_{min\_out}+R_s}\right)$$

$$S_2 = R_{min\_out} \times \alpha = R_{min\_out} \times \sin^{-1}\left(\frac{H+n+b_0}{R_{min\_out}+R_s}\right)$$

where H is the length of the parking space needed, $R_s$, is the turning radius of the inner rear wheel for the first turn, $R_{min\_out}$ is the minimum turning radius of the outer rear wheel of the vehicle for the second turn, $\phi_s$ is the rotation angle of the steering wheel for the first turn, $S_1$ is the moving length of the inner rear wheel for the first turn, $S_2$ is the moving length of the inner rear wheel for the second turn and $\alpha$ is the included angle between the initial position and the reversing point, for the second turn the vehicle moving at the maximum steering wheel angle $\theta_{max}$; and the processing unit calculating the parking path based on the formulas and then controlling a vehicle steering, a throttle and a brake to automatically park the vehicle from the initial position into the parking space according to the planned parking path; during the parking process, if any obstacles invading the planned path are detected, the auto-parking operation will be suspended and hand over the control priority to the user; upon elimination of the obstacle, the user can reactivate the device to complete the auto-parking operation.

2. The auto-parking device as claimed in claim 1, wherein the processing unit is connected to an adjusting unit for setting and adjustment.

3. The auto-parking device as claimed in claim 1, wherein the vehicle status sensing unit includes a reverse sensing unit, an angle sensing unit and a displacement sensing unit; the reverse sensing unit is connected to a vehicle shift mechanism to detect whether the shift is switched to reverse gear; the angle sensing unit is connected to a vehicle steering mechanism to detect the steering angle of the vehicle; and the displacement sensing unit is connected with the vehicle speed so as to calculate the moving distance of the vehicle.

4. The auto-parking device as claimed in claim 1, wherein the processing unit controls the vehicle steering, the throttle and the brake via a driving control unit to automatically park the vehicle into the parking space according to the planned parking path.

5. The auto-parking device as claimed in claim 1, wherein the processing unit detects whether the length of the parking space measured achieves a required minimum value of $H+2b_0$ for performing the auto-parking.

6. The auto-parking device as claimed in claim 1, wherein the processing unit calculates a predicted parking spot and superimposed onto the image of actual parking vacancy, and then shown on the display unit; the position of the predicted parking spot can be fine-adjusted through the display unit or the adjusting unit.

7. The auto-parking device as claimed in claim 6, wherein the display unit is a touch panel for setting and adjustment.

8. An auto-parking device installed on a vehicle, comprising:
a vehicle status sensing unit for detecting a state of the vehicle,
an image acquisition unit for capturing the vehicle outside image,
a range sensing unit for measuring a parking space,
a processing unit for receiving states of the vehicle from the vehicle status sensing unit, receiving the surrounding information of the vehicle from the image acquisition unit and the range sensing unit, and calculating a parking path, the parking path including a first turn starting from an initial position to a reverse point and a second turn starting from the reverse point to an ending point, the parking path calculated according to a lateral distance between the initial position of the vehicle and an obstacle in front of the measured parking space and a longitudinal distance between the initial position of a vehicle tail and the obstacle in front of the measured parking space, such that the vehicle is unnecessary to stop at a specific initial position, the processing unit connected to a display unit,
wherein in back-in parking, following parameters are used:
a vehicle length L,
a wheelbase l,
a vehicle width W,
a steering ratio N being the ratio of the steering wheel angle to the front wheel turning angle,
a distance from the rear axle to the vehicle tail c,
a maximum steering wheel angle $\phi_{max}$,
a length margin of the parking space $b_0$,
a width margin of the parking spaces $b_1$,
a width of the parking space is D,
a length of the parking space is Z,
the lateral distance between the initial position of the host vehicle and an obstacle in front of the target parking space m,
the longitudinal distance between the initial position of the host vehicle tail and the obstacle in front of the target parking space n,
formulas for computing the back-in parking path expressed as follows, $$R_{min\_in} = \left[ l \cdot \cot\left(\frac{\phi_{max}}{N}\right) - \frac{W}{2} \right]$$

$$R_{min\_out} = \left[ l \cdot \cot\left(\frac{\phi_{max}}{N}\right) + \frac{W}{2} \right]$$

$$S_1 = R_{min\_in} \times \frac{\pi}{2}$$

$$S_2 = Z - (R_{min\_in} - m) - c - b_2$$

where $R_{min\_in}$ is the minimum turning radius of the inner rear wheel of the vehicle, $R_{min\_out}$ is the minimum turning radius of the outer rear wheel of the vehicle, $S_1$ is the moving length of the inner rear wheel before the reversing point is, and $S_2$ is the moving length of the inner rear wheel after the reversing point, for the first turn the vehicle moving at the maximum steering wheel angle max $\phi_{max}$, and the processing unit calculating the parking path based on the formulas and then controlling a vehicle steering, a throttle and a brake to automatically park the vehicle from the initial position into the parking space according to the planned parking path; during the parking process, if any obstacles invading the planned path are detected, the auto-parking operation will be suspended and hand over the control priority to the user; upon elimination of the obstacle, the user can reactivate the device to complete the auto-parking operation.

9. The auto-parking device as claimed in claim 8, wherein the processing unit is connected to an adjusting unit for setting and adjustment.

10. The auto-parking device as claimed in claim 8, wherein the vehicle status sensing unit includes a reverse sensing unit, an angle sensing unit and a displacement sensing unit; the reverse sensing unit is connected to a vehicle shift mechanism to detect whether the shift is switched to reverse gear; the angle sensing unit is connected to a vehicle steering mechanism to detect the steering angle of the vehicle; and the displacement sensing unit is connected with the vehicle speed so as to calculate the moving distance of the vehicle.

11. The auto-parking device as claimed in claim 8, wherein the processing unit controls the vehicle steering, the throttle and the brake via a driving control unit to automatically park the vehicle into the parking space according to the planned parking path.

12. The auto-parking device as claimed in claim 8, wherein the processing unit detects whether the parking space is greater than a required minimum value of $W+2b_1$.

13. The auto-parking device as claimed in claim 8, wherein the processing determines whether the measured value m is greater than a required minimum value of $R_{min\_in} - \sqrt{R_{min\_in}^2 - (R_{min\_out} - W - b_1)^2} + b_0$ and whether n is equal to the value of $R_{min\_out} - W - c - b_1$; and only if these conditions are conformed completely, the auto-parking maneuver can be performed.

14. The auto-parking device as claimed in claim 8, wherein the processing unit calculates a predicted parking spot and superimposed onto the image of actual parking vacancy, and then shown on the display unit; the position of the predicted parking spot can be fine-adjusted through the display unit or the adjusting unit.

15. The auto-parking device as claimed in claim 14, wherein the display unit is a touch panel for setting and adjustment.

* * * * *